United States Patent [19]

Van Mullem

[11] 4,393,955
[45] Jul. 19, 1983

[54] MOTORBUS OR SIMILAR VEHICLE

[75] Inventor: Albert Van Mullem, Boutersem, Belgium

[73] Assignee: PVBA Van Mullem, Tienen, Belgium

[21] Appl. No.: 365,807

[22] Filed: Apr. 5, 1982

Related U.S. Application Data

[63] Continuation of Ser. No. 140,419, Apr. 14, 1980, abandoned.

[30] Foreign Application Priority Data

Apr. 12, 1979 [BE] Belgium .............................. 194570

[51] Int. Cl.³ ............................................. B60K 9/00
[52] U.S. Cl. .................................... 180/291; 180/312; 280/781; 296/179
[58] Field of Search .................... 180/291, 299, 54 C, 180/292, 297, 308, 312; 280/781, 790; 296/25, 178, 179

[56] References Cited

U.S. PATENT DOCUMENTS 2,005,312 6/1935 Church ........................... 296/178 X
2,426,582 9/1947 Austin ................................ 296/178
3,881,765 5/1975 Cerra et al. ......................... 296/178

FOREIGN PATENT DOCUMENTS 2245974 4/1974 Fed. Rep. of Germany ...... 296/178
483257 4/1938 United Kingdom ................ 180/291
924971 5/1963 United Kingdom ................ 296/179

*Primary Examiner*—Robert J. Spar
*Assistant Examiner*—Donald W. Underwood
*Attorney, Agent, or Firm*—Wood, Dalton, Phillips, Mason & Rowe

[57] ABSTRACT

There is described a motorbus or similar vehicle, which is provided in the top part of the bodywork thereof with a self-supporting structure integrated therein, which extends over the whole vehicle length, whereby said integrated structure bears directly on the wheel axles, in such a way that there is notably a possibility of lowering the vehicule floor due to the omitting of the bearing function of those bodywork structures present below the floor and the taking over of such function by said structure integrated in the top bodywork part.

6 Claims, 3 Drawing Figures

MOTORBUS OR SIMILAR VEHICLE

This is a continuation of application Ser. No. 140,419 filed Apr. 14, 1980, now abandoned.

This invention relates to a motorbus or similar vehicle with lowered entrance and exit height.

The invention has for object to provide an original solution to the problem of making the entrance and exit height of a motorbus as low as possible while taking into account that said height cannot become so low as to bring the danger of damaging the frame or transmission members during the ride.

For this purpose the motorbus or similar vehicle according to the invention is provided in the top part of the bodywork thereof with a self-supporting structure integrated therein, which extends over the whole vehicle length, whereby said integrated structure bears directly on the wheel axles, in such a way that there is notably a possibility of lowering the vehicle floor due to the omitting of the bearing function of those bodywork structures present below the floor and the taking over of such function by said structure integrated in the top bodywork part.

In a preferred embodiment of the invention, at least one and preferably two drive engines are mounted in said self-supporting structure integrated in the top bodywork part.

Advantageously each driving wheel or driving wheel set is driven separately by said motor or motors, which makes it possible to dispense with the vehicle rear axle.

A feature of the invention lies in means being provided to bring the bodywork in a raised position and in a lowered position relative to the wheel shafts.

Other details and features of the invention will stand out from the following description given by way of non limitative example and with reference to the accompanying drawings, in which.

Figure 1:
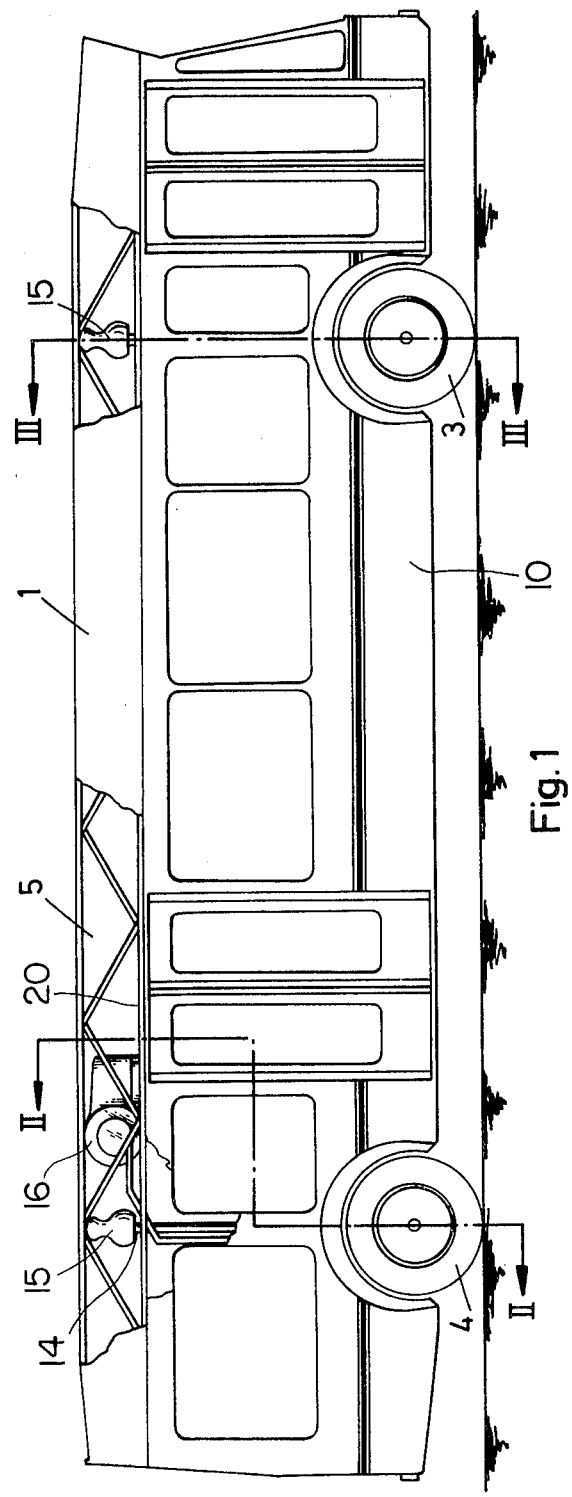
FIG. 1 is a diagrammatic side view with parts broken away, of a motorbus according to the invention.

The motorbus as shown in the figures is notably comprised of a bodywork 1, wheel shafts 2 including a first frame member mounting the driving wheels 3 and a second frame member mounting steering wheels 4. The frame members extend between the wheels at opposite sides of the vehicle and have a major part of their length well below the axes of wheel rotation. The top part of said bodywork is reinforced over the whole length or at least over the useful length thereof, with a structure in the form of a hollow lengthwise beam 5. Said beam structure 5 is self-supporting but can be connected to a number of uprights 6 which are part of stiffening elements 7 from the bodywork floor. Actually the complete bodywork forms a hollow structure which is stiffened against bending by said hollow beam structure 5.

Level with the wheel shafts 2, the flat walls 10 from bodywork 1 merge into walls 8, 8' respectively, which are connected to bodywork walls 1 by flat plates 9, 9' respectively.

The complete hollow beam formed by the bodywork together with the top beam structure 5 resiliently bears on supports 11, 12 which are fast to the wheel shafts 2.

The spring suspension of the complete bodywork relative to said wheel shafts 2 is thus provided by hydraulic cylinders 13 which cooperate with pistons 14 connected thereto, through spring or shock-absorbing means 15.

Due to the presence of the lengthwise beam structure 5, the conventional stiffening structures which were provided underneath the vehicle floor can be dispensed with, in such a way that the floor of the motorbus or similar vehicle can lie particularly low, which gives remarkable conditions for stepping in and out.

Figure 2:
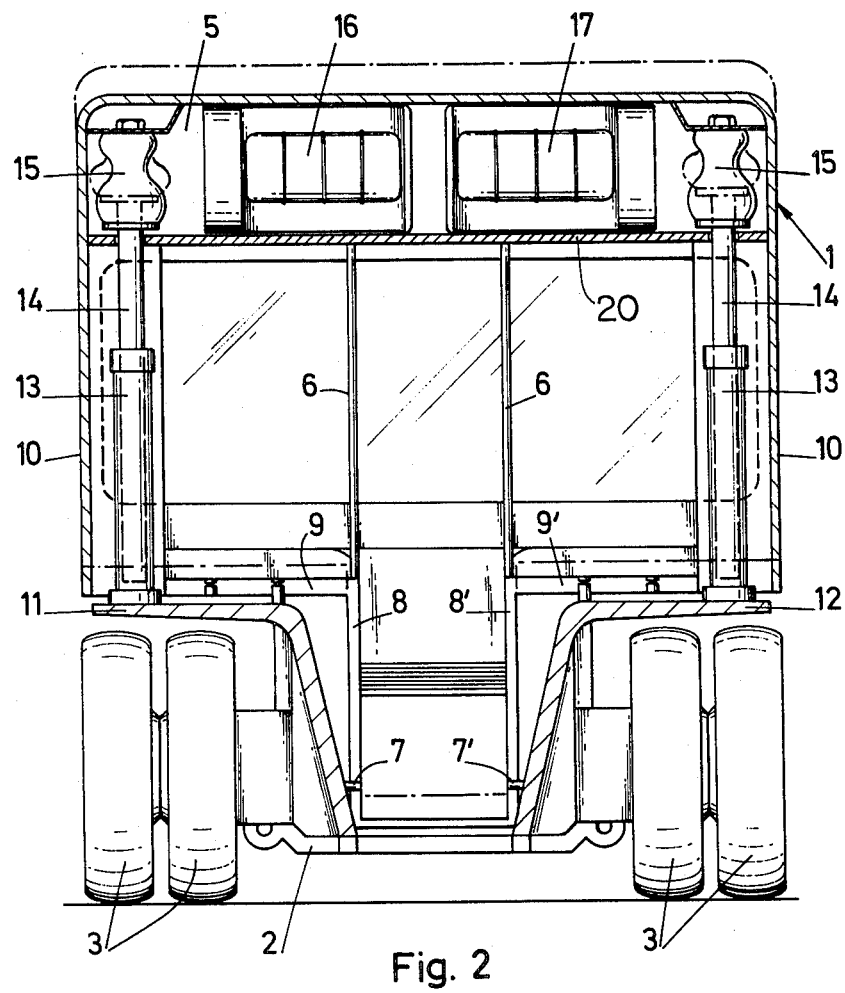
FIG. 2 is a diagrammatic cross-section along line II—II in FIG. 1, whereby the raised and lowered positions are shown.
Figure 3:
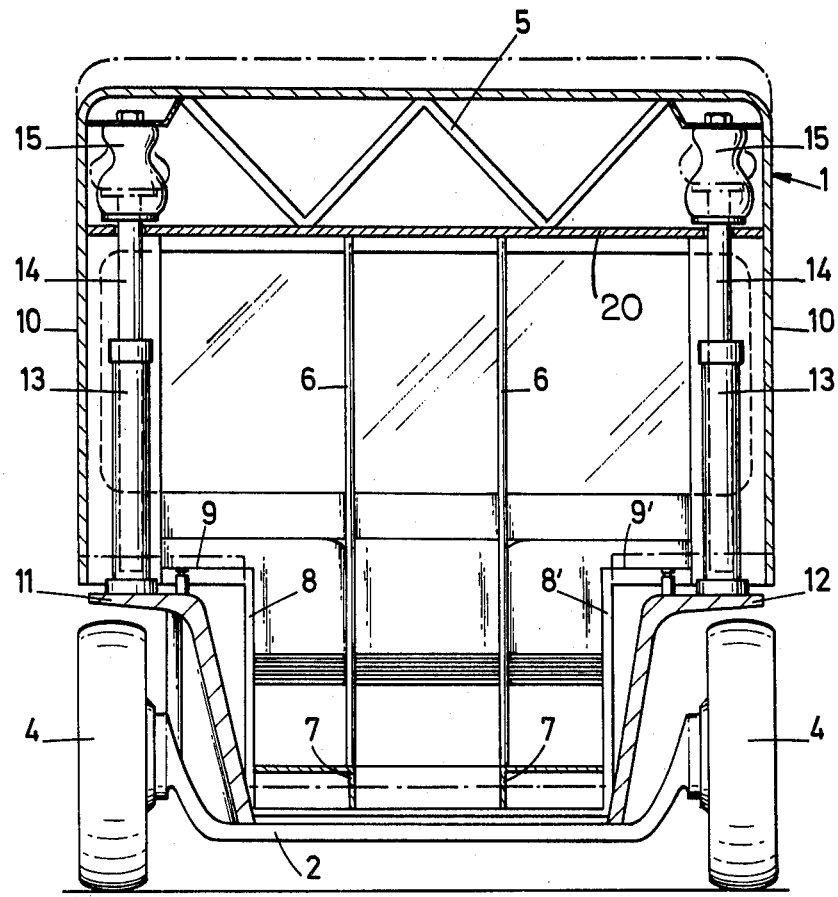
FIG. 3 is a diagrammatic cross-section along line III—III in FIG. 1, whereby the raised and lowered positions are shown.

In said hollow beam structure 5, above a ceiling panel 20, can be mounted one, but preferably two engines 16 and 17 (FIG. 2). The transmission or transmissions occur separately to one driving wheel or driving wheel set. The vertical parts of the transmission can be arranged in the hollow walls of the bodywork. A hydraulic transmission can also be of very good service thereby.

When one or more driving engines are mounted inside the hollow beam structure 5, the drive axle of the vehicle may naturally be dispensed with, which also contributes to the final object of the arrangement according to the invention, that is to make it possible to locate particularly low the floor and thus the entrance and exit height of the motorbus or similar vehicle.

In another embodiment, the driving engine can be built-in at the back of the vehicle. In such a case, the driving wheels 3 can be driven directly from said driving engine. In such a case, the rear axle of the vehicle is also dispensed with, in such a way that there is also a possibility to let the floor go down markedly low at the entrance and exit.

To make stepping in and out easier, use can be made of means controlling the hydraulic cylinders 13 and pistons 14 and which are independent of the springing of the vehicle proper.

It appears from the above description that the motorbus or other vehicle can be fitted with a markedly low floor and that the lowermost position is naturally limited to the stops. This is made possible by dispensing with the stiffening structure of the vehicle bottom or floor and by dispensing with the rear axle. Such arrangements in turn are made possible by the structure of the bodywork proper which is stiffened in the top part thereof by the hollow beam structure, both in the crosswise and lengthwise directions.

A structure built according to the invention can also be used essentially to build special vehicles wherein loading and discharging can be performed under very favourable conditions and with the use of power means.

It must be understood that the invention is in no way limited to the above embodiments and that many changes can be brought therein without departing from the scope of the invention as defined by the appended claims.

I claim:

1. A vehicle such as a motor bus having at least a first wheeled support having first wheels adjacent one end thereof and a second wheeled support having second wheels adjacent the other end thereof, said supports including cross members extending between the wheels, a bodywork having a length at least substantially equal to the distance between said wheeled supports, said bodywork defining an upper beam structure, body means suspended from said beam structure and including a lowermost floor with at least a part of the floor at or below the level of the axis of rotation of said wheels, said beam structure defining means for stiffening the bodywork against both transverse and longitudinal bending, and support means for resiliently supporting said beam structure on said wheeled supports, said support means including an upright portion extending upwardly from said wheeled supports and adjacent the side walls of the bodywork, and further including uppermost shock absorbers between said upright portion and said beam structure for providing enhanced stability in the support of the beam structure in its upper disposition.

2. A vehicle as defined in claim 1 in which at least one drive engine is mounted to said beam structure.

3. A vehicle as defined in claim 1 wherein said support means includes a rigid lower portion and upper adjustably extensible members for enabling selective adjustment of the elevation of the bodywork.

4. A vehicle as defined in claim 3 wherein said extensible members comprise hydraulic cylinders.

5. A vehicle as defined in claim 1 including means for further supporting the floor from said cross members of the wheeled supports.

6. A vehicle as defined in claim 1 wherein at least one drive engine is mounted within said beam structure.

* * * * *